UNITED STATES PATENT OFFICE.

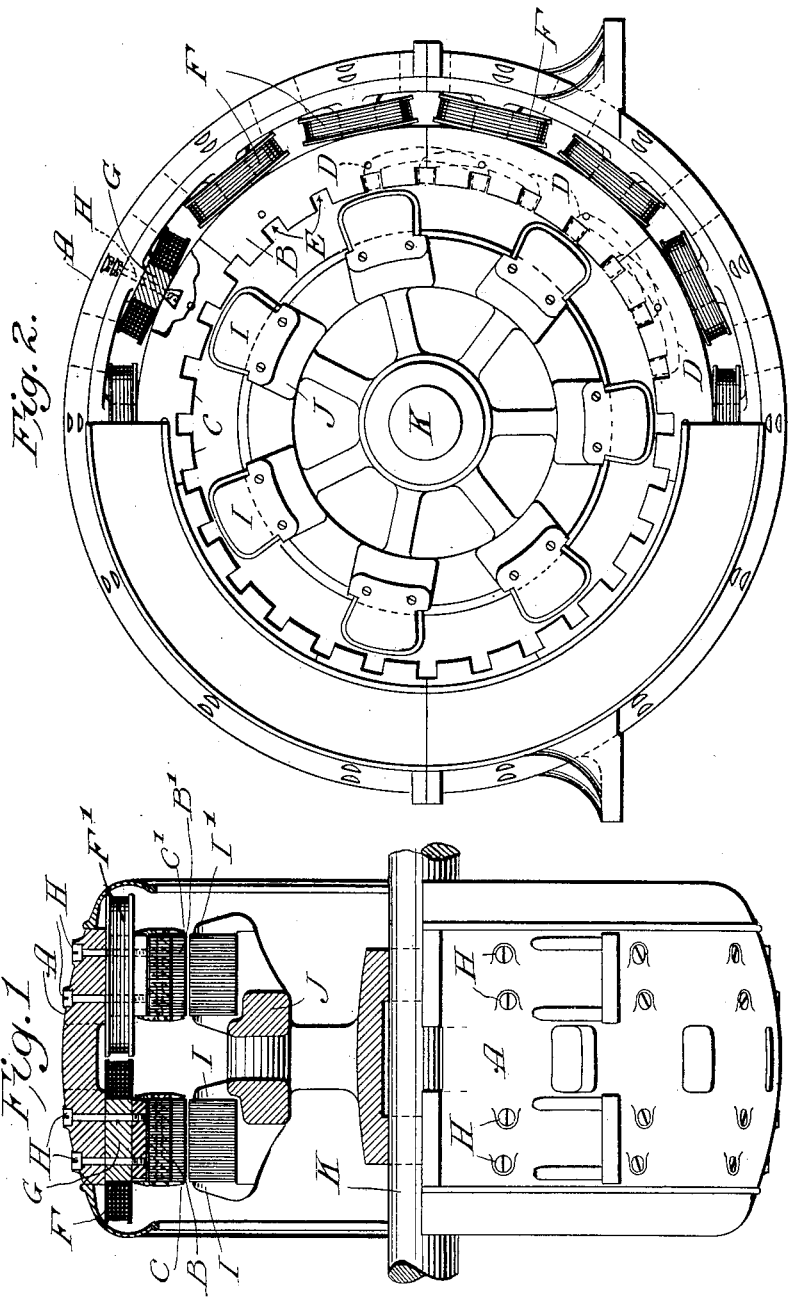

CUMMINGS C. CHESNEY, OF PITTSFIELD, MASSACHUSETTS.

DYNAMO-ELECTRIC MACHINE.

SPECIFICATION forming part of Letters Patent No. 661,306, dated November 6, 1900.

Application filed May 11, 1900. Serial No. 16,333. (No model.)

*To all whom it may concern:*

Be it known that I, CUMMINGS C. CHESNEY, a citizen of the United States, residing at Pittsfield, county of Berkshire, State of Massachusetts, have invented certain new and useful Improvements in Dynamo-Electric Machines, of which the following is a full, clear, and exact description.

My invention relates to improvements in dynamo-electric machines in which there are one or more continuous polar surfaces each suitably energized and carrying armature-coils and means for directing the magnetic flux through said coils. Heretofore machines of this class have been constructed with large energizing-coils surrounding the rotating inductor, and it has been found that in such machines, particularly when they are of the large size, the energizing-coils have to be shipped separately and are of such size as to make them exceedingly difficult to handle and to transport with safety. It has further been found with machines in which the energizing-coil surrounds the inductor and its shaft that by reason of the magnetomotive force set up in the shaft itself stray magnetism is produced, which when the generator is connected directly to its engine magnetizes the engine and may at times interfere with the governor action.

The objects of my invention are to do away with the large-sized energizing-coils and also to make a construction in which the stray magnetism will be lessened and no magnetomotive force set up in the shaft which will interfere with the direct connection of the generator with its engine; also, to provide features of construction which will render the apparatus efficient and enable it to be easily constructed and assembled. I attain these objects by the mechanism illustrated in the accompanying drawings, in which—

Figure 1 is an end view, partly in section, of a generator embodying my improvements; and Fig. 2 is a side elevation of the same, also partly in section.

Referring more particularly to the drawings, A is a supporting-shell, within which are two laminated bodies B B', having continuous surfaces C C', at each of which are secured armature-coils D, which are preferably sunk in recesses E, formed therein. These polar surfaces are energized by coils F F', which are located between the laminated bodies B B' and the shell A, as shown, said laminated bodies and shell being separated by blocks G, which are surrounded by said coils F F', and being held in position by bolts H H to permit their easy insertion and removal. In front of the polar surface and armature-coils are rotated the polar projections I I' of the inductor J, mounted on the shaft K, so that when the inductor revolves the flux through the armature-coils is varied, causing the machine to operate. It will be seen that in this construction the coils are of such size as to make them easy to handle and to ship if it is desired to transport them separately from the machine. It is also to be noticed that they do not set up any magnetomotive force in the shaft of the machine, and in that way stray magnetism is avoided, that there is no danger of magnetizing the engine directly connected to the generator, and that the parts of the apparatus are easily assembled. It can be used either as a generator or motor, as may be desired.

What I claim is—

1. In a dynamo-electric machine the combination of a magnetic body having a continuous surface of revolution, an inclosing shell, energizing-coils giving said entire surface one definite polarity, with their axes substantially radial to the axis of revolution, said energizing-coils being located between the shell and said magnetic body armature-coils having both limbs located at said continuous surface and an inductor mounted so as to rotate before said coils, substantially as described.

2. In a dynamo-electric machine the combination of a supporting-shell, a laminated body having a continuous surface within said shell, energizing-coils located between said shell and said laminated body giving said surface one definite polarity, armature-coils having both limbs located at said continuous surface of said body and carried thereby and an inductor rotatably mounted within said armature-coils, substantially as described.

3. In a dynamo-electric machine the combination of a supporting-shell, two laminated bodies having continuous surfaces within the same, energizing-coils located between said shell and said bodies making the continuous surfaces of said bodies of opposite polarity, armature-coils having both limbs located at the said surfaces of said bodies and supported thereby, and an inductor mounted so as to rotate within said coils, substantially as described.

4. In a dynamo-electric machine the combination of a supporting-shell concentric with the axis of the machine, a laminated body having a continuous surface of revolution within said shell, removable connecting-blocks between said body and said shell at intervals, energizing-coils surrounding said connecting-blocks and having their convolutions in planes parallel to the axis of revolution, armature-coils carried at the continuous surface of said shell and an inductor mounted so as to rotate before said armature-coils, substantially as described.

Signed at Pittsfield, Massachusetts, this 8th day of May, 1900.

CUMMINGS C. CHESNEY.

Witnesses:
JOHN F. KELLY,
M. L. NICHOLS.